United States Patent Office 3,501,206
Patented Mar. 17, 1970

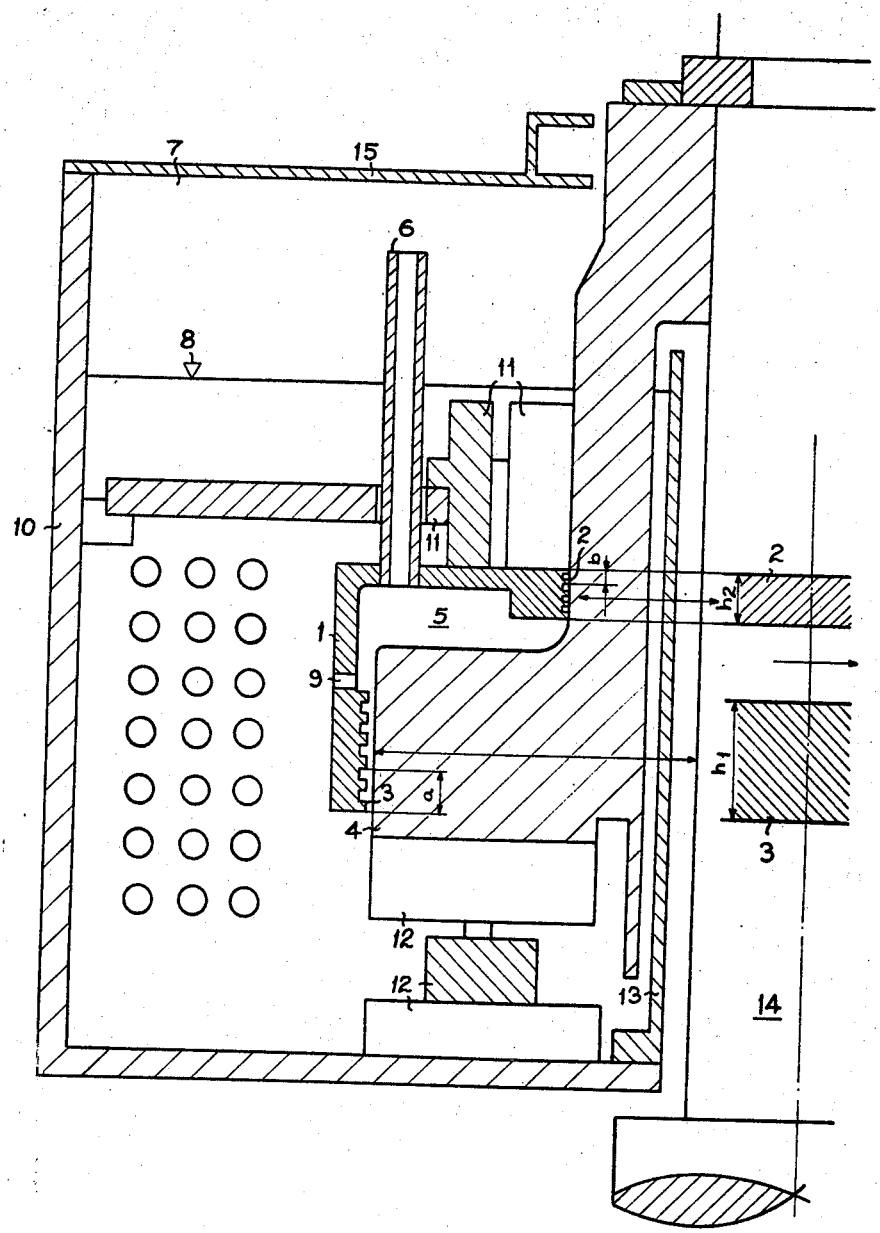

3,501,206
COMBINED AXIAL AND RADIAL BEARING WITH LIQUID LUBRICATING FLUID FOR VERTICAL AXIS MACHINE
Kalman Nagy Lehoczky, Hyggen, Norway, assignor to Aktiengesellschaft Brown, Boveri & Cie, Baden, Switzerland, a Swiss joint-stock company
Filed Sept. 11, 1968, Ser. No. 759,108
Claims priority, application Norway, Sept. 29, 1967, 169,924
Int. Cl. F16c *17/06, 17/08*
U.S. Cl. 308—160           3 Claims

ABSTRACT OF THE DISCLOSURE

A combined radial and axial bearing structure using liquid lubricant is provided for the shaft of a machine which rotates on a vertical axis. The diameter of the radial bearing is smaller than the diameter of the axial bearing and the bearing parts are enclosed by a shield which is provided at both ends with spiral grooves. A chamber is established between the shield and the rotating parts and this chamber is emptied of the lubricating liquid by the pumping action of the hydrodynamic packings in order to reduce the rotating losses.

---

The present invention relates to a combination axial and radial bearing with liquid lubrication for machines with vertical shaft, independent of the principle on which the bearing works; the most common construction form is that where the radial bearing is arranged above the axial bearing, since the most important elements of the bearing can this way be most easily checked and replaced.

The radial bearing can be arranged on a smaller sliding surface-diameter than the outside diameter of the axial bearing, or on the same diameter. In the former alternative one has smaller radial bearing losses, because of the smaller sliding surface diameter, but on the other hand one obtains relatively large disk and cylinder-shaped surfaces, which must rotate in the oil bath, causing great friction or so-called rotation losses. In the other alternative the losses in the radial bearing will increase, while the rotation losses are greatly reduced, since the large disk-shaped surface of the bearing head can be arranged above the oil level. The sum of the two types of losses will vary somewhat in dependence on the load, the speed of rotation and the bearing-diameter. Accordingly one embodiment will show the smallest sum of losses in one case, while the other will show the smallest sum of losses in another case.

The object of the invention is to reduce the above mentioned rotation losses in a combination axial and radial bearing with liquid lubrication for machines which rotate on a vertical axis, where the diameter of the radial bearing is smaller than the outside diameter of the axial bearing. This is achieved according to the invention in that the rotating parts of the combination bearing are enclosed by a shield which is provided at both ends with spiral grooved-packings, a closed chamber being formed between the shield and the rotating parts which is emptied by the pumping action of the hydrodynamic packings.

An embodiment of the invention will be described more fully on the basis of the accompanying drawing wherein the figure shows one half of a combination axial and radial bearing in an axial section.

The invention is based on the fact that the combination bearing has a large free surface which is formed by the disk-shaped and cylindrical parts rotating in the oil bath inside the bearing housing 10. The vertical parts of the radial bearing are designated by 11 and those of the axial bearing by 12. The rotating parts 4 are enclosed by a shield 1 which has at both ends a packing 2 and 3 respectively, which is designed as a spiral groove and which is of the hydrodynamic type, the width of these packings being designated by $h1$ and $h2$ respectively. These spiral grooved-packings are so designed that they work against each other, so that the lubricating oil is pumped from the chamber 5 between the shield 1 and bearing head 4. It is also advisable to provide one or more pumps 6 which bring the chamber 5 in communication with the air space 7 above the oil level 8. In this way the intermediate chamber 5 is evacuated and the oil replaced by air, so that the rotating surfaces or parts 4 move in air instead of oil, and the rotation losses are greatly reduced. Numeral 14 denotes the machine shaft which is surrounded by an inner oil shield 13, and 15 denotes the cover of the bearing housing.

Since the pump pressure of the spiral grooves 2, 3 is much higher in oil than in air, and is proportional to the axial length of the oil-filled spiral grooves, the entire width of the spiral grooves is not drained. An equilibrium will be established when the static outside pressure is equal to the pressure produced by a spiral groove with $a$ and $b$ respectively. At a lower circumferential velocity the mass $a$ and $b$ will be great, at a high circumferential velocity small.

Certain friction losses are caused in the spiral grooved-packings. These losses are proportional to the viscosity, immersed groove-width $a$ and $b$ respectively, the square of the angular velocity and of the third power of the diameter, but inversely proportional to the groove width. This has the result that much smaller losses, for example, 10–20 times smaller, are obtained on the upper packing 2 than on the lower packing 3. In addition, the heated oil trickles down through the packing 2 and is replaced by new, colder oil. In the lower packing 3 the situation is different, which requires special measures. The shield 1 can be provided with one or more small holes 9 through which a certain amount of oil will flow steadily from the oil reservoir to the intermediate chamber 5. In this manner one obtains a certain circulation which prevents overheating and foaming of the oil.

A very great advantage of the arrangement described above is that the oil level 8 in the bearing housing 10 can be freely adjusted corresponding to the lubricating- and cooling need of the radial- and axial bearing, and that a dry surface is nevertheless obtained where the great rotation losses used to appear.

The hydrodynamic packings 2 and 3 can be so arranged that the spiral grooves are either on the rotating or on the stationary part of the bearing.

I claim:
1. In a combined axial and radial bearing with liquid lubrication for machines rotating on a vertical axis where the diameter of the radial bearing is smaller than the outside diameter of the axial bearing, the improvement wherein the rotating parts (4) of the combination bearing are enclosed by a shield (1) which is provided at both ends with spiral-grooved packings (2, 3), a closed chamber (5) being formed between the shield (1) and the rotating parts (4), which is emptied by the hydrodynamic pumping action of the packings.

2. Combination axial and radial bearing according to claim 1, wherein said chamber (5) is in communication through at least one pipe (6) with the air space (7) above the surface of the lubricating liquid in the bearing housing.

3. Combination axial and radial bearing according to claim 1, wherein at least one hole (9) is provided in the wall of the shield through which said chamber (5) is in communication with the lubricating fluid outside the shield.

References Cited

FOREIGN PATENTS 571,745    9/1945    Great Britain.

MARTIN P. SCHWADRON, Primary Examiner

F. SUSKO, Assistant Examiner